US00RE46241E

(19) United States
(12) Reissued Patent
Cain et al.

(10) Patent Number: US RE46,241 E
(45) **Date of Reissued Patent: *Dec. 20, 2016**

(54) WELLHEAD COMPLETION ASSEMBLY CAPABLE OF VERSATILE ARRANGEMENTS

(71) Applicant: Weatherford/Lamb, Inc., Houston, TX (US)

(72) Inventors: Brandon Matthew Cain, Houston, TX (US); Todd Travis, Humble, TX (US); Michael L. Bilyeu, The Woodlands, TX (US); Gordon Ronnie Altman, Spring, TX (US); Steve Willard, Corpus Christi, TX (US); Carl Edwin Davidson, Humble, TX (US); John Rogers, Grand Junction, CO (US); Robert Scott Menard, Houston, TX (US)

(73) Assignee: Weatherford Technology Holdings, LLC, Houston, TX (US)

( * ) Notice: This patent is subject to a terminal disclaimer.

(21) Appl. No.: 14/226,275

(22) Filed: Mar. 26, 2014

Related U.S. Patent Documents

Reissue of:
(64) Patent No.: 7,779,921
Issued: Aug. 24, 2010
Appl. No.: 11/925,498
Filed: Oct. 26, 2007

(51) Int. Cl.

| | |
|---|---|
| ***E21B 19/00*** | (2006.01) |
| ***E21B 17/02*** | (2006.01) |
| ***E21B 17/08*** | (2006.01) |
| ***E21B 33/03*** | (2006.01) |
| ***E21B 33/04*** | (2006.01) |

(52) U.S. Cl.
CPC ..... *E21B 17/02* (2013.01); *E21B 17/08* (2013.01); *E21B 17/085* (2013.01); *E21B 33/03* (2013.01); *E21B 33/0415* (2013.01)

(58) Field of Classification Search
None
See application file for complete search history.

(56) References Cited

U.S. PATENT DOCUMENTS 2,122,071 A * 6/1938 Rasmussen et al. ..... 285/123.4
2,159,526 A * 5/1939 Humason ..... 166/68.5
(Continued)

OTHER PUBLICATIONS

Wood Group, "Special Products: Independent Wellhead System (IWS)," Product Brochure, dated Apr. 2007, 2-pgs.
(Continued)

*Primary Examiner* — Glenn K Dawson
(74) *Attorney, Agent, or Firm* — Blank Rome, LLP

(57) ABSTRACT

A wellhead completion assembly has a head connected to surface casing. A rotatable flange or the like can be used to connect various components to a threaded end of the head. A casing hanger installs in the head, and the hanger's upper end extends beyond the head's top edge. This exposed end has an external threaded connection to connect to various wellhead components using a rotatable flange or the like. For example, a locking ring can threadably connect to the head's threaded end to support the hanger in the head. Then, a rotatable flange can threadably connect to the hanger's exposed end so that another component, such as a completion spool or gate valve, can nippled up directly to the hanger. When the hanger is fluted, a pack-off assembly can allow testing off inner and outer sealing integrity via a test port accessible through an opening in the locking ring.

40 Claims, 10 Drawing Sheets

(Amended)

(56) References Cited

U.S. PATENT DOCUMENTS

| | | | | |
|---|---|---|---|---|
| 3,972,546 | A | 8/1976 | Putch | |
| 4,552,213 | A | 11/1985 | Boyd et al. | |
| 4,690,221 | A | 9/1987 | Ritter, Jr. | |
| 4,958,686 | A | 9/1990 | Putch | |
| 5,028,079 | A * | 7/1991 | Smith et al. | 285/123.6 |
| 5,439,061 | A * | 8/1995 | Brammer et al. | 166/368 |
| 5,492,373 | A | 2/1996 | Smith | |
| 5,605,194 | A | 2/1997 | Smith | |
| 5,996,695 | A | 12/1999 | Koleilat et al. | |
| 6,015,009 | A | 1/2000 | Allen | |
| 6,192,981 | B1 | 2/2001 | Boquet et al. | |
| 6,640,902 | B2 * | 11/2003 | Baten et al. | 166/368 |
| 6,834,718 | B2 | 12/2004 | Webster | |
| 7,032,677 | B2 | 4/2006 | McGuire et al. | |
| 7,040,410 | B2 | 5/2006 | McGuire et al. | |
| 7,066,269 | B2 | 6/2006 | Dallas et al. | |
| 7,159,652 | B2 | 1/2007 | McGuire et al. | |
| 7,159,663 | B2 * | 1/2007 | McGuire et al. | 166/379 |
| 7,237,615 | B2 * | 7/2007 | Dallas et al. | 166/379 |
| 7,267,180 | B2 | 9/2007 | McGuire et al. | |
| 7,308,934 | B2 * | 12/2007 | Swagerty et al. | 166/177.5 |
| 7,422,070 | B2 | 9/2008 | Dallas et al. | |
| 7,428,931 | B2 | 9/2008 | McGuire et al. | |
| 7,779,921 | B2 * | 8/2010 | Cain et al. | 166/379 |
| 2004/0231856 | A1 | 11/2004 | Dallas et al. | |
| 2004/0262012 | A1 | 12/2004 | McGuire et al. | |
| 2005/0006103 | A1 | 1/2005 | McGuire et al. | |
| 2005/0051362 | A1 | 3/2005 | McGuire et al. | |
| 2005/0139360 | A1 * | 6/2005 | Van Bilderbeek | 166/382 |
| 2006/0060349 | A1 * | 3/2006 | Duhn et al. | 166/88.1 |
| 2006/0196677 | A1 | 9/2006 | McGuire et al. | |
| 2006/0237193 | A1 | 10/2006 | Dallas et al. | |
| 2007/0102150 | A1 | 5/2007 | McGuire et al. | |
| 2007/0251702 | A1 | 11/2007 | Dallas et al. | |
| 2007/0267198 | A1 | 11/2007 | McGuire | |
| 2007/0277968 | A1 | 12/2007 | McGuire et al. | |
| 2009/0025925 | A1 | 1/2009 | McGuire et al. | |
| 2009/0032265 | A1 | 2/2009 | Borak, Jr. et al. | |

OTHER PUBLICATIONS

Datta, Indrajit, FMC Technologies Canada, "DTO Time-Saving Conventional Wellhead," Canadian Association of Drilling Engineers eNews, obtained from http://www.cade.ca/news.php?m=2006_12_A1, Dec. 2006, 4-pgs.

FMC Technologies, "Isolation Sleeve Technology," obtained from http://www.fmctechnologies.com/, generated Jun. 8, 2007, 1-pg.

FMC Technologies, "DTO Wellhead," obtained from http://www.fmctechnologies.com/, generated Jun. 8, 2007, 5-pgs.

Canadian Assocation of Drilling Engineers, December Luncheon, obtained from http://www.cade.ca/, 8-pgs.

FMC Technologies, "FMC Surface Wellhead Catalog," copyrighted 2004, pp. 1, 57, & 106.

* cited by examiner

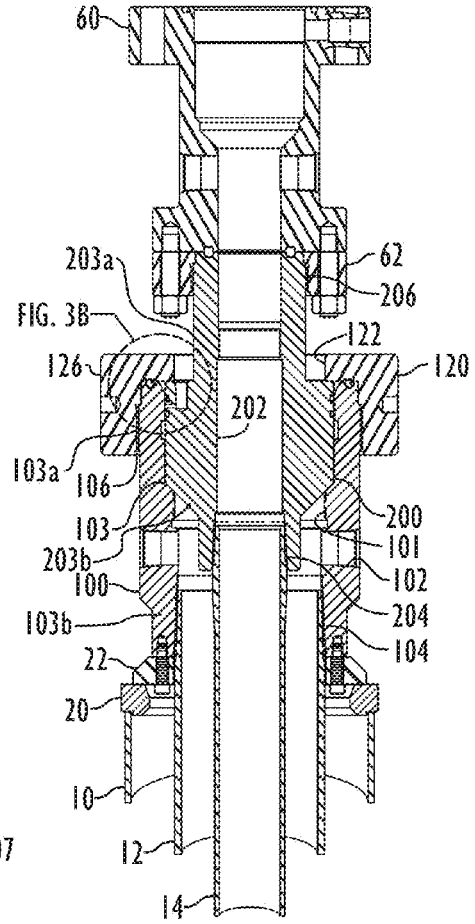
FIG. 3A
(Amended)

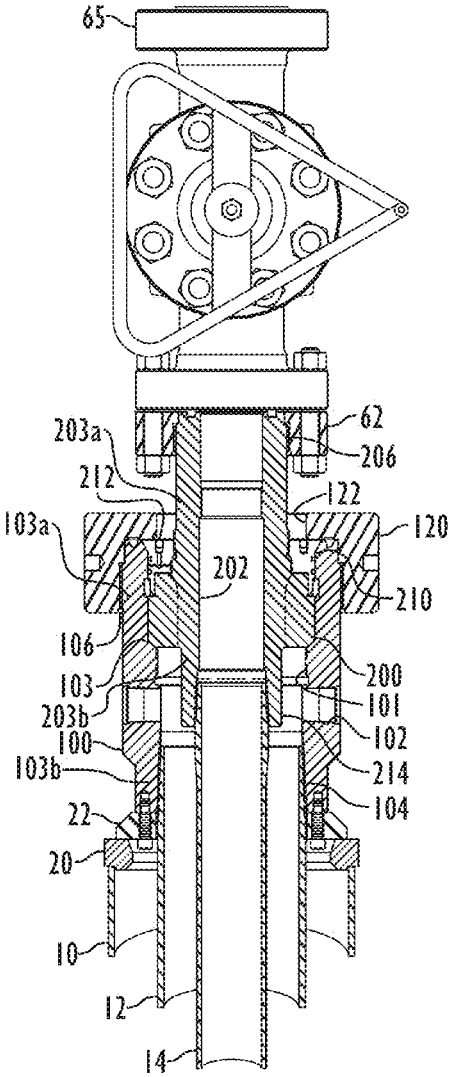
FIG. 4
(Amended)
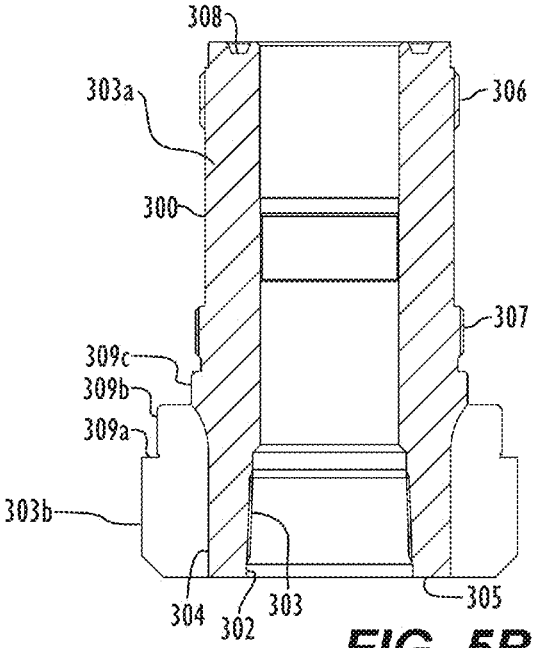
FIG. 5B
(Amended)

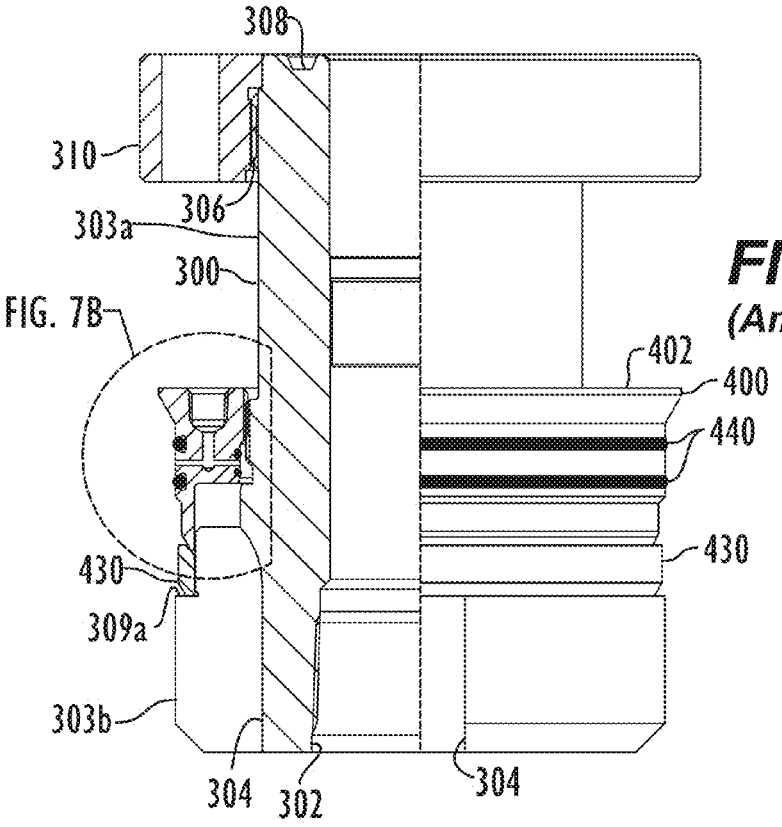
FIG. 7A
(Amended)
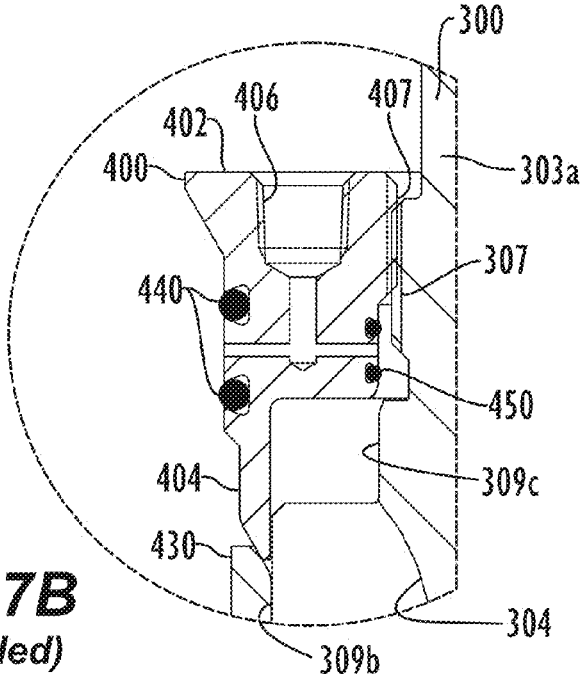
FIG. 7B
(Amended)

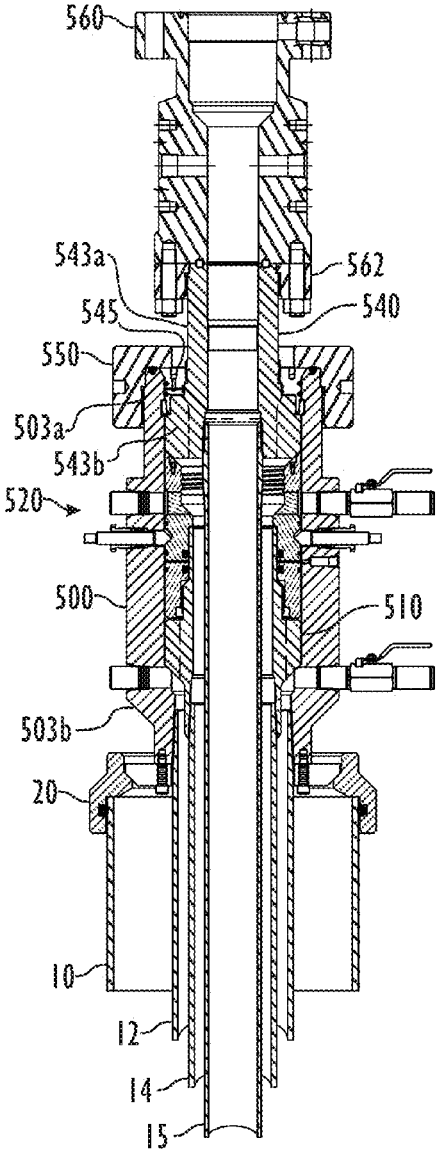
FIG. 10B
(Amended)

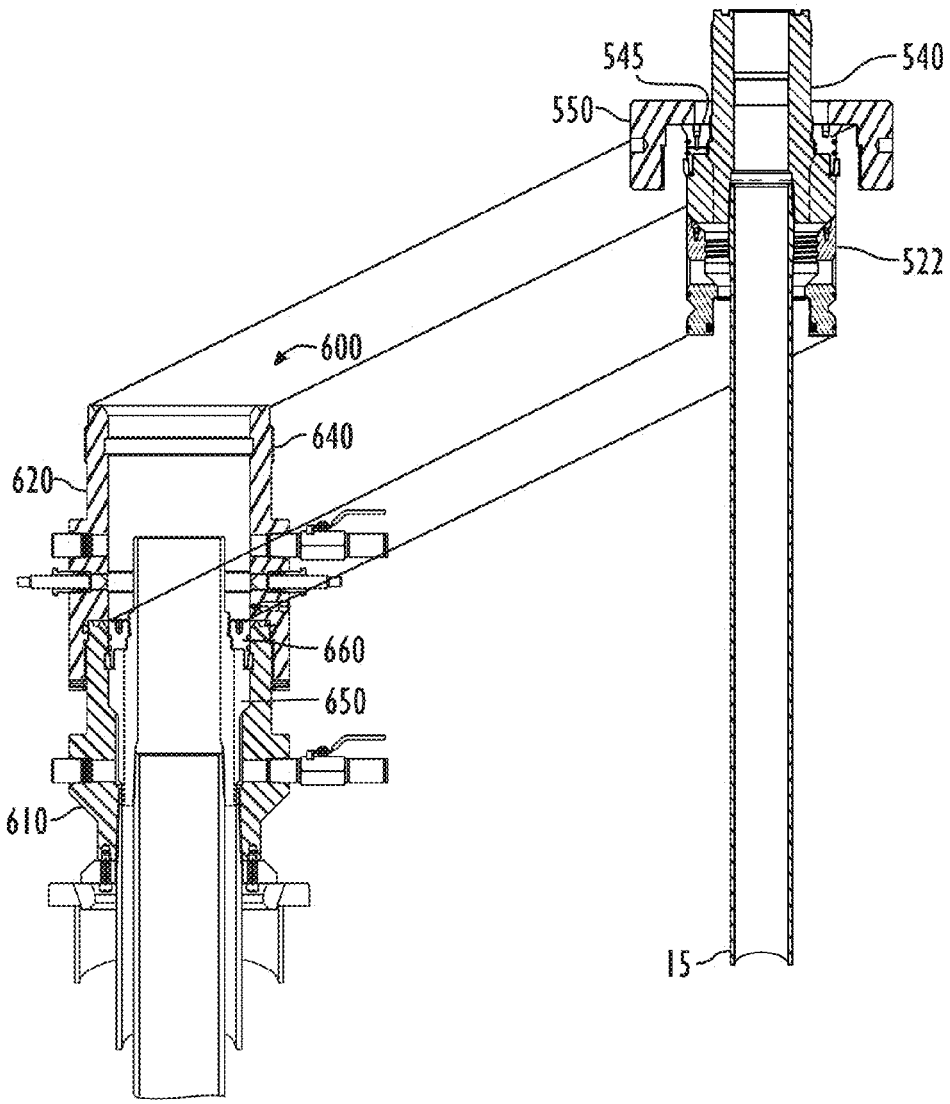
FIG. 11E
(New)

WELLHEAD COMPLETION ASSEMBLY CAPABLE OF VERSATILE ARRANGEMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

A well has one or more casings installed in a borehole to reinforce and seal it, and wellhead components install at the surface above the exposed end of the casings. For example, FIG. 1 shows a wellhead arrangement according to the prior art. Typically, an outermost conductor pipe is driven into place in the borehole, and a base assembly 11 is on the exposed end of conductor pipe 10. A casing head 30 lands on the base assembly 11 and connects to a surface casing 14 supported inside the conductor pipe 10. Typically, the space between the casing 14 and pipe 10 is filled with cement. One or more adapters 40 and components 50 of a blow-out preventer can connect above the casing head 30. As shown in FIG. 1, flanged connections are typically used to connect the various components together.

Because various operations may be performed at the wellhead, the arrangement of components may be modified to accommodate different operations, pressures, and implementations. One typical wellhead operation involves fracing. According to conventional practices, an isolation tool, such as a stinger, installs in the wellhead to isolate bores and outlets from pressures that may be higher than pressure-ratings for the wellhead's flange connections.

In one typical wellhead arrangement, a casing hanger supports casing in the casing head, and a tubing spool nipples to the casing head so that another hanger can be used in the tubing spool to support tubing in the casing. Typically, an adapter must be installed on the casing head prior to nippling up the tubing spool so that the adapter can pack-off or seal around the casing hanger. In another typical wellhead arrangement, a fluted casing hanger support casing in the casing head so that drilling fluids during cementing operations are allowed to return through the hanger's flutes. Later, a pack-off bushing installs above the fluted casing hanger to seal off the flutes. Typically, there is only a limited ability to test the seal created by such a pack-off.

SUMMARY

A wellhead completion assembly is capable of versatile arrangements. The assembly has a first head component that connects to surface casing. A rotatable flange or the like can be used to connect various components to a threaded end of this first head component. Alternatively, second head components can threadably stack on top of one another and can threadably stack on top of the first head component to create a multi-bowl arrangement.

For either arrangement, the assembly can use a casing hanger that installs in the head (i.e., first head component in a single-bowl arrangement or the top most second head component in a multi-bowl arrangement). In either case, the hanger's upper end extends beyond the head's top edge. This exposed end has an external threaded connection to connect to various wellhead components using a rotatable flange or the like. For example, a locking ring can threadably connect to the head's threaded end to support the casing hanger in the head. Then, a rotatable flange can threadably connect to the hanger's exposed end so that another component, such as a completion spool or gate valve, can nippled up directly to the casing hanger.

The casing hanger can be fluted or not, and a pack-off plate can be used to seal the casing hanger in the head. This pack-off plate can have a test port accessible through an opening in the locking ring holding the hanger in the head. The test port allows operators to test the inner and outer sealing integrity of the pack-off plate. In one particular arrangement, the casing hanger has a sealing ring positioned about its external surface. The pack-off plate threads onto an external threaded connection on the casing hanger, and a lip on the pack-off plate positions in wedged engagement between the sealing ring and a portion of the external surface of the casing hanger.

BRIEF DESCRIPTION OF THE DRAWINGS

FIG. 3A is a cross-sectional view illustrating the assembly of FIG. 2 in another arrangement having a completion spool nippled up to the casing hanger.

FIG. 4 is a cross-sectional view illustrating the assembly of FIG. 2 in yet another arrangement having a gate valve nippled up to the casing hanger.

FIGS. 5A-5B are top and cross-sectional views illustrating a fluted casing hanger for the disclosed assembly.

FIG. 7A is a partial cross-sectional view illustrating a flange and the pack-off components on the fluted casing hanger of FIGS. 5A-5B.

FIG. 7B is a detail of FIG. 7A illustrating features of the pack-off components.

FIG. 10B is a cross-sectional view illustrating the assembly of FIG. 10A in another arrangement.

DETAILED DESCRIPTION

A versatile wellhead completion assembly is capable of various arrangements. The assembly includes a casing head that lands on a conductor pipe and connects to surface casing. The head's upper end has an external threaded connection to which various components can be connected depending on the desired arrangement. For example, a rotatable flange or other connector can thread onto the head's upper end, and a component of a blow-out preventer (BOP) can bolt to the rotatable flange above the casing head.

The assembly also includes a casing hanger that lands in the casing head to support production casing within the surface casing. When installed in the head, the hanger's upper end extends beyond the head's top edge. This exposed end has an external threaded connection that allows various components to connect to the hanger's upper end depending on the desired arrangement. For example, a locking ring can threadably connect to the head's external threaded connection to support the casing hanger in the casing head. Then, a rotatable flange or other connector can threadably connect to the hanger's exposed end so that a completion spool, gate valve, or other wellhead component can bolt to the rotatable flange above the casing hanger.

In other arrangements, the casing head can be used with conventional wellhead components and can be landed through a riser using a running tool threaded to internal threads in the casing head. In addition, the casing hanger used in the various arrangements can be fluted, and a pack-off assembly that allows testing a inner and outer seals can be used with the fluted casing hanger. In still other arrangements, modular head components of the assembly permit operators to make various arrangements of the head components to suit their needs in either single-bowl or multiple-bowl arrangements and to facilitate contingency operations in the event a stuck pipe occurs.

Figure 1:
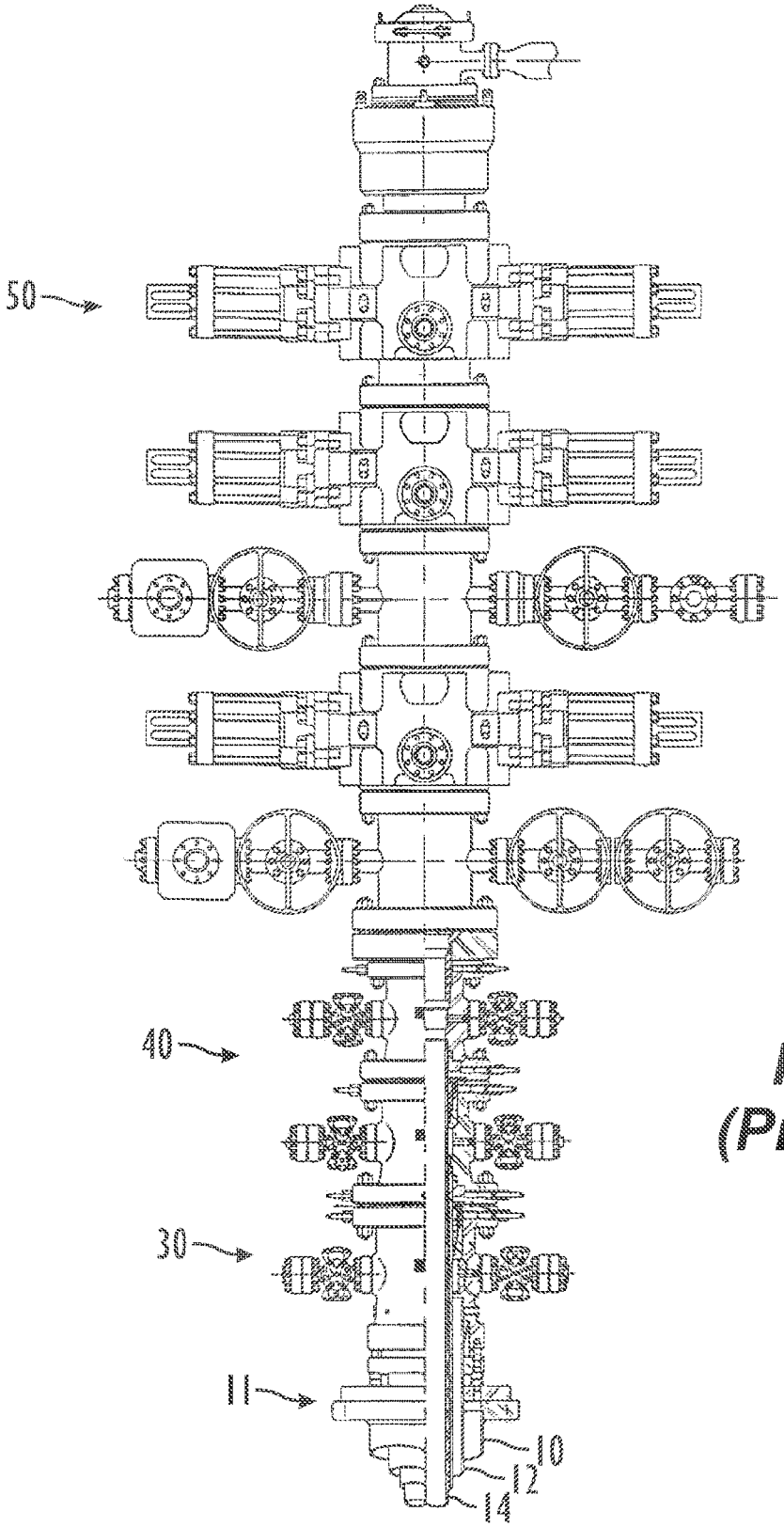
FIG. 1 (Prior Art)
FIG. 1 is a partial cross-sectional view illustrating a wellhead arrangement according to the prior art.
Figure 2:
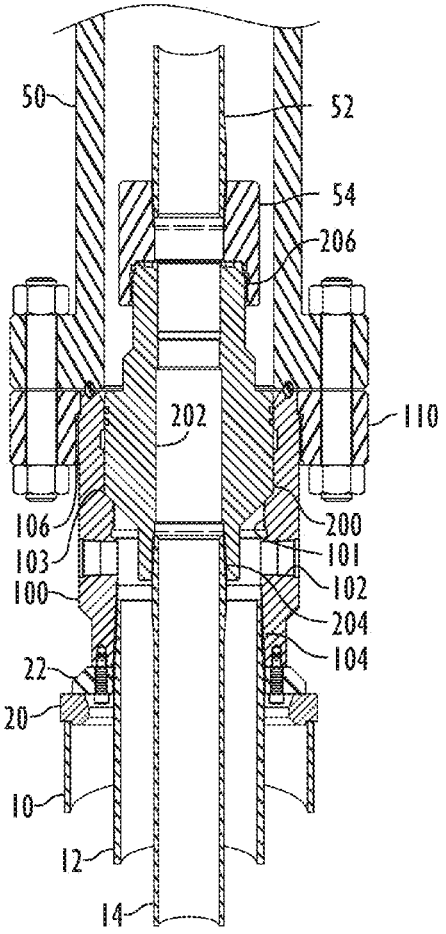
FIG. 2 is a cross-sectional view illustrating a wellhead completion assembly in one arrangement having portion of a Blow-Out Preventer (BOP) stack nippled up to a casing head.

Turning now to the drawings, FIG. 2 illustrates a well completion assembly having a casing head 100 and a casing hanger 200. The casing head 100 with a landing ring 22 attached thereto lands on a support ring 20 on an exposed end of conductor pipe 10, and an internal threaded connection 104 connects to surface casing 12. Side ports 102 for valves or the like are provided in the head's bore 101 for various uses during well operations. When the casing head 100 is installed as shown, flutes (not shown) in the rings 20/22 can allow cement to be inserted between the conductor pipe 10 and the surface casing 12 during a cementing job.

In the arrangement, a rotatable flange 110 threadably connects to an external threaded connection 106 on the casing head's upper end *103a*, and a BOP stack component 50 nipples up to the casing head 100 by bolting to the flange 110. To seal this connection, a gasket is disposed in a groove at head's top edge. Rather than using the rotatable flange 110 as shown, a drilling adapter, such as element 530 shown in FIG. 10A, or other connector could alternatively be used.

Also in the arrangement, the casing hanger 200 has production casing 14 connected by an internal threaded connection 204 at the hanger's lower end *203b*. To install the hanger 200 and the casing 14, a running tool 52 connects by a coupling 54 to an external threaded connection 206 at the hanger's upper end *203a*, and the hanger 200 and the casing 14 are run through the BOP stack component 50 and into the casing head 100. Once run in, the casing hanger 200 lands in the head 10 by engaging an internal shoulder 103 so that the production casing 14 is supported within the surface casing 12.

As will be appreciated, each of the components of the assembly is composed of a suitable material known in the art for a wellhead component. Preferably, the threaded connections (106, 204, and 206) have ACME-2G left-handed thread forms. For some exemplary dimensions, the conductor pipe 10 may be 16-in. casing, and the surface and production casings 12/14 may respectively be 9⅝-in. and 4½-in. casings. The connection of the rotatable flange 110 to the BOP stack component 50 may be 11-in. rated at a working pressure of 5,000-PSI. As one skilled in the art will appreciate, these values are provided as examples for illustrative purposes, and components of the assembly can be sized for 13-inch connections and other sizes of casing.

Figure 3B:
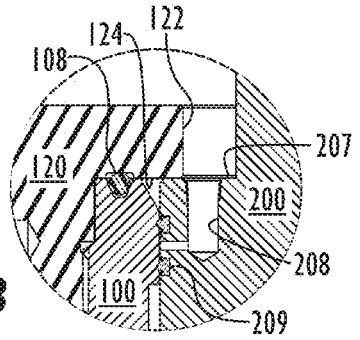
FIG. 3B is a detail illustrating portions of the casing hanger, the locking ring, and the casing head of FIG. 3A.

During operations, it would be desirable to be able to nipple up a tubing spool above a production casing hanger without requiring the use of secondary pack-off to seal around the hanger. As shown in FIG. 3A, the disclosed assembly allows a completion spool 60 to nipple up to the casing hanger 200 of the disclosed assembly without the need for secondary pack-off. In this arrangement, a locking ring or head ring 120 defining a central opening 122 installs over the hanger's end *203a* exposed above the head 100, and internal threads on the ring's sides 126 couple to the external threaded connection 106 on the casing head 100. This connection 106 can be 11-in. rated at a working pressure of 10,000-PSI. As shown in the detail of FIG. 3B, the ring's inside surface 124 engages the hanger's upper shoulder 207 to hold the hanger 100 in the head 100. Also, the inside surface 122 engages a gasket 108 disposed in a groove at the head's top edge.

With the ring 120 installed, the tubing spool 60 call couple directly to the exposed end *203a* of the hanger 200. In particular, a rotatable flange 62 or other connector threads onto the hanger's external threaded connection 206, and the spool 60 bolts to the rotatable flange 62. A gasket is disposed in a groove at the hanger's top edge to seal the connection. This connection between hanger 200 and spool 60 can be 4 1/16-in. rated at a working pressure of 10,000-PSI, for example. With the spool 60 connected, other components can then be connected above the spool 60, and tubing (not shown) can eventually be hung in the spool's bowl using a tubing hanger (not shown). Because the completion spool 60 nipples up directly to the hanger 200, the casing hanger 200 essentially acts as a spool, and the need for secondary pack-off is eliminated.

As shown in detail in FIG. 3B, the hanger's upper shoulder 207 defines a test port 208 that communicates between two sealing seats 209 disposed about the hanger's outer cylindrical surface. With the hanger 200 installed in the head's internal bore 101 as shown, this test port 208 is accessible through the ring's opening 122 so that the seal formed between the sealing seats 209 and the casing head's internal bore 101 can be tested.

FIG. 4 shows a similar arrangement with a gate valve 65 nipple up to the casing hanger 200 of the assembly. Again, the rotatable flange 62 couples to the external threaded connection 206 on the exposed end *203a* of the hanger 200, and the gate valve 65 bolts to the flange 62. As will be appreciated, the gate valve 65 may be used for facing operations or the like. With respect to frac operations, it would be desirable to be able to frac at high pressures without needing to use an isolation tool in the wellhead. In current arrangement of the disclosed assembly, there is no need to use an isolation tool (or a nipple up/down apparatus for such an operation). Rather, interior frac pressures can reach as high as the internal yield pressure of the production casing 14 itself because the housing of the casing 14 communicates directly with the gate valve 65 through the casing hanger 200. Therefore, frac pressures that can be used with the disclosed assembly are not limited by conventional flange pressure ratings of adapters or the like that would typically be used above a production casing hanger.

The hanger 200 shown in FIG. 4 has flutes that allow fluid returns past the hanger 200 when used in some arrangements. In FIG. 4, however, a pack-off assembly 210 having a pack-off plate and other components forms a seal between the fluted hanger 200 and the inside surface of locking ring or head ring 120. When this form of pack-off is done, it is desirable to have an adequate and convenient way to test the pack-off's inner and outer seals. In the prior art, however, the only way to test the integrity of a pack-off's seals requires operators to nipple up the next spool above the pack-off assembly and to then perform a flange pressure test. For example, FIG. 9A discussed below shows a conventional pack-off plate 74 having an inner seal that engages casing 14 and having an outer seal that engages casing head 100. To test the seals, a tubing spool 70 must be rippled up to the casing head 100, and a flange pressure test must be performed using a test port 73 on the spool 70. If the test fails, operators have to nipple down the spool 70 and pull out the pack-off plate 74 to investigate the cause. This procedure can be time intensive.

In contrast, the pack-off assembly 210 in FIG. 4 has a top-access test port 212 accessible through the sealing ring's opening 122. This test port 212 communicates between two sets of inner and outer seals on the assembly 210. In this way, the sealing integrity of the assembly's inner and outer seals can be tested simultaneously and as soon as the assembly 210 is installed so that time can be saved on site. Further details of a fluted hanger and a pack-off assembly are discussed below with reference to FIGS. 5A through 8C.

Figure 5A:
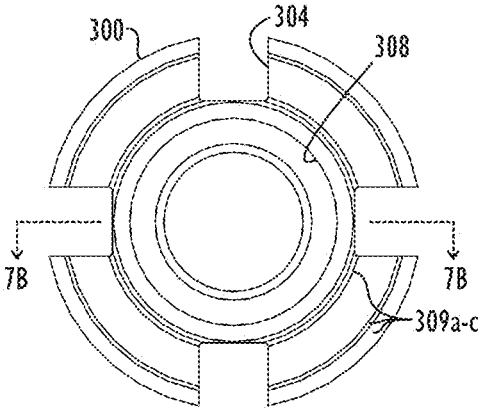

FIGS. 5A-5B illustrate a fluted casing hanger 300 for use with the disclosed assembly in top and cross-sectional views, respectively. As with other hangers disclosed herein, the fluted hanger 300 has an internal bore 302 with an internal threaded connection 303 at its lower end *303b* to connect to production casing (not shown). In addition, the hanger's upper end *303a* has an external threaded connection 306 for coupling to running tool as in FIG. 2 or to a rotatable flange as in FIG. 3A. Furthermore, the hanger's top edge defines an annular well 308 for a gasket (not shown) used to seal engagement between the hanger 300 and the various other components discussed herein.

Being fluted, however, the hanger's lower end *303b* defines a plurality of flutes or cutaways 304 (four shown in FIG. 5A) that enable fluid returns to communicate past the hanger 300. In another distinction, the hanger 300 as shown in FIG. 5B has a blunt or flat lower end *305* as opposed to the substantially extended and narrowed lower end (*e.g., 214: FIG. 4*) of the other hangers disclosed herein. It will be appreciated that any of the other hangers (either fluted or not) disclosed herein may have a similar blunt end *305* if desired.

Figure 6:
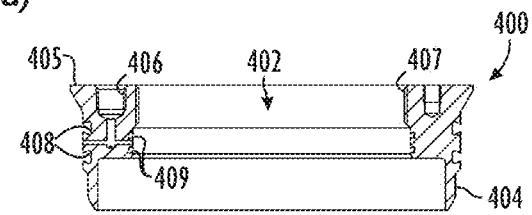
FIG. 6 is a cross-sectional view illustrating a pack-off plate.

As briefly discussed above in FIG. 4, a pack-off assembly 210 can be used to seal communication through flutes of a fluted hanger when returns are no longer desired. When used, the pack-off assembly 210 preferably allows the sealing integrity of inner and outer seals to be tested in an adequate and convenient way. For such as a pack-off assembly, FIG. 6 illustrates a pack-off plate or sealing ring 400 capable of such testing ability, and FIGS. 7A-7B illustrate the pack-off plate 400 and an additional sealing ring or hanger ring 430 positioned on the fluted casing hanger 300 of FIGS. 5A-5B.

As best shown in FIGS. 7A-7B, the sealing ring or hanger ring 430 positions adjacent a lowermost shoulder 309a on the hanger 300. The pack-off plate 400 (shown in cross-section in FIG. 6) has a central opening 402 and positions over the hanger's narrower end *303a* and threads its internal threads 407 onto intermediate threaded connection 307 on the hanger 300. This pack-off plate 400 may be referred to as a production casing hanger pack-off or an H-plate.

As the pack-off plate 400 is tightened onto the hanger 300, internal seals 450 (e.g., O-rings) on the pack-off plate 400 eventually engage a side portion 309b of the hanger's surface, while outer seals 440 (e.g., O-rings) engage the internal wall of the casing head's bore (not shown). Likewise, the plate's lower lip 404 wedges in between the lowermost ring 430 and a side portion 309b of the hanger's surface so that the lower-most ring 430 seals against the internal wall of the casing head's bore (not shown).

To test the sealing integrity, the pack-off plate 400 defines a test port 406 in its top surface 405 that is accessible when the locking ring (e.g., 120 in FIG. 4) is used. As best shown in the cross-section of the plate 400 in FIG. 6, the test port 406 communicates with spaces between the outer and inner seats 408/409 for the seals (440/450) so that their sealing integrity can be tested. Because this test port 406 is accessible through the locking ring's opening (122), this testing can be done during partial assembly of the pack-off or after complete assembly of the arrangement.

In addition to being used with the casing hanger 200, pack-off assembly 210, and other components discussed above, the casing head 100 can be used on its own with various other wellhead components in a number of other arrangements. In one example shown in FIG. 8, the casing head 100 can be run through a riser 16 and landed on a support ring 20 using an internal running tool 18. To run the head 100, the internal running tool 18 has a coupling 19 that attaches to an internal threaded connection 107 in the casing head's bore 101.

Figure 9B:
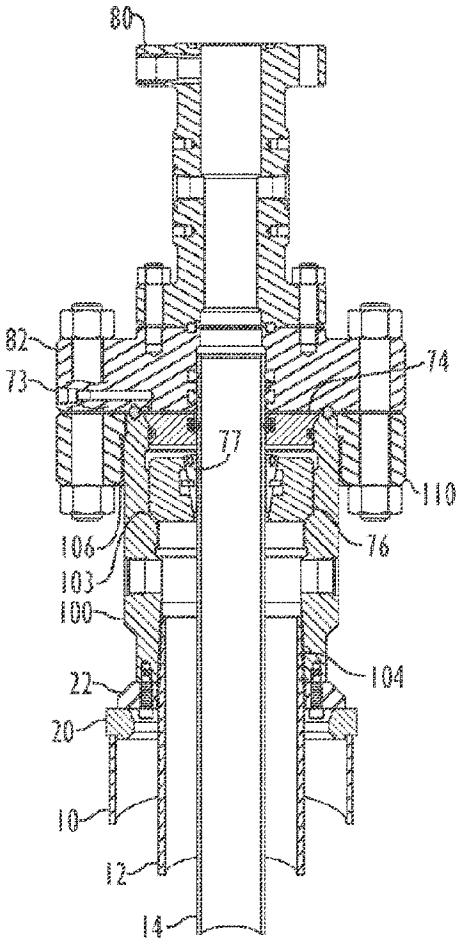
FIGS. 9A-9B are cross-sectional views illustrating the casing head of FIG. 2 used with other wellhead components.
Figure 9A:
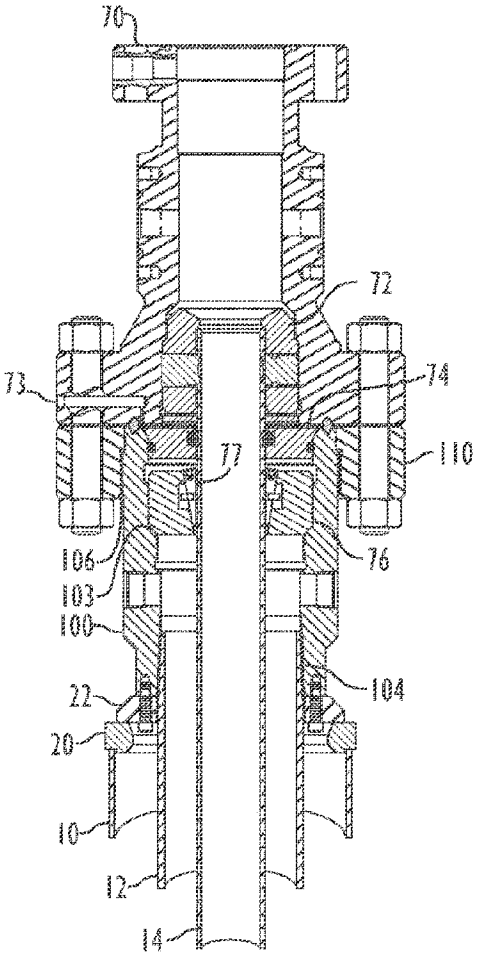

In other uses, the casing head 100 can also be used on its own in conjunction with some conventional wellhead components. For example, FIG. 9A shows the casing head 110 having a completion spool 70 nippled up to the head 100 with a rotatable flange 110. FIG. 9B shows a similar arrangement, but in this example, a completion spool 80 and adapter 82 nipple up to the casing head 100 with a rotatable flange 110.

In both arrangements, a conventional hanger 76 having slips 77 lands on the head's internal shoulder 103 to support the production casing 14, and a conventional pack-off plate 74 seals against the production casing 14 and the head 100. Segmented rings 72 engage against the production casing 14 within the spool 70 in FIG. 9A, while internal seals in the adapter 82 engage against the end of production casing 14 in FIG. 9B.

Figure 10A:
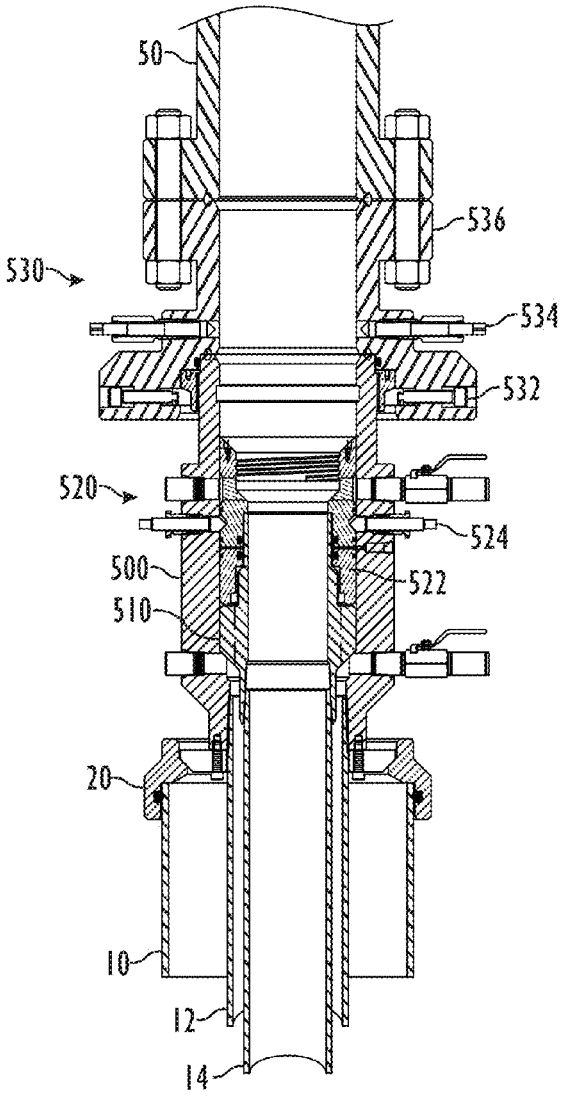
FIG. 10A is a cross-sectional view illustrating another embodiment of a wellhead completion assembly in one arrangement.

The casing head 100 disclosed above represents a single-bowl type, meaning that it defines a single bowl and has a length for supporting a single hanger. FIGS. 10A-10B illustrates a wellhead completion assembly having a casing head 500 that represents a double-bowl type. Accordingly, one casing hanger 510 (FIG. 10A) or two casing hangers 510/540 (FIG. 10B) can be used with this casing head 500. Although shown as fluted, the casing hangers 510/540 could be mandrel hangers, if desired.

In the arrangement of FIG. 10A, a BOP stack component 50 nipples up to the casing head 500. In this example, the connection uses a drilling adapter 530 that has a locking assembly 532 for quick connect to the casing head 500, pack-off screws 534 for other purposes, and a flange 536 for bolting to the BOP stack component 50. The casing hanger 510 lands in the casing head 500 through the BOP stack component 50 using a running tool (not shown). A pack off assembly 520 having pack-off elements 522 installs above the casing hanger 510, and pack-off screws 524 on the head 500 engage the elements 522. Once installed, the pack-off assembly 520 forms an additional bowl in the head 500. In this example, the conductor pipe 10 can be 20-in. casing, and the surface casing 12 can be 9⅝-in casing. The casing hanger 510 can support 7-in. production casing.

In the arrangement of FIG. 10B, the casing hanger 510 and the pack-off assembly 520 again install in the casing head 500 *toward its lower end 503b*, and a fluted hanger 540 *with flutes on its lower end 543b* and *a* pack off assembly 545 install in the *upper* end *503a* of the casing head 500. A locking ring 550 threads onto the *upper* end *503a* of the casing head 500 and engages the pack-off assembly 545, and a completion spool 560, gate valve, or other component nipples up to the *upper* end *543a* of the fluted hanger 540 with a rotatable flange 562 or other connector. In this example, the first hanger 510 can support 7-in. production casing 14, while the second hanger 540 can support 4.5-in. casing 15.

Figure 8:
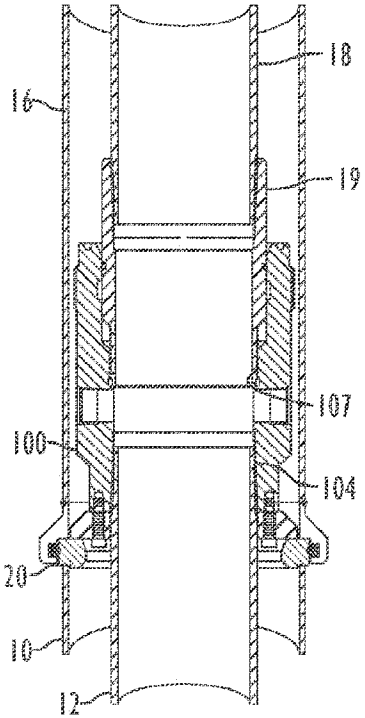
FIG. 8 is a cross-sectional view illustrating the casing head of FIG. 2 landed through a riser.

In addition to these arrangements of FIGS. 10A-10B, the double-bowl type casing head 500 can be landed through a 20-in. riser using a running tool in much the same manner as depicted in the example of FIG. 8, with the exception that the running tool couples to the outer threaded connection at the top *or upper* end *503a* of the casing head 500. Moreover, the casing head 500 and other components of FIGS. 10A-10B can be used with completion spools, adapters, and other conventional components similar to the arrangements in FIGS. 9A-9B (e.g., elements 70, 72, 74, 76, 77, 80, and 82).

The double-bowl type casing head as shown in FIGS. 10A-10B can be used in various operations when several casing strings are to be run downhole. FIGS. 11A-11D illustrate another wellhead completion assembly 600 in various stages of assembly that can support several casing strings. In addition, to being able to support multiple strings, this assembly 600 has modular head components 610 and 620 that offer a number of advantages, including allowing the assembly 600 to be assembled in different arrangements and facilitating contingency operations when a stuck pipe occurs before a hanger can be properly landed in the head.

Figure 11A:
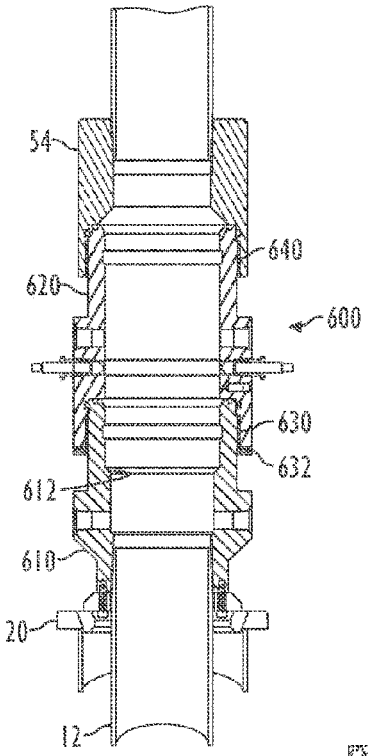
FIGS. 11A-11[D]*E* are cross-sectional views illustrating a wellhead completion assembly having modular head components in various stages of assembly.

As shown in FIG. 11A, the modular assembly 600 includes first and second head components 610 and 620. The first head component 610 can be similar to the casing head of previous embodiments, such as casing head 100 in FIG. 2, and can be used alone in a single bowl type of arrangement. Alternatively, the second head component 620 can connect to the first head component to make a double-bowl type of casing head.

In assembling the double bowl arrangement, for example, the first head component 610 connected to outer casing 12 lands on the landing assembly 20, and the second head component 620 supported by running tool 54 threads to the first component 610 at a threaded connection 630. This threaded connection 630 can use the same type of threading and rating as previous embodiments. For example, this connection 630 can be similar to the connection 106 in FIG. 2 having ACME-2G left-handed thread form and can be 11-in. rated at a working pressure of 10,000-PSI. Holes 632 and setscrews (not shown) may also be used to couple the second component 620 to the first component 610.

Figure 11B:
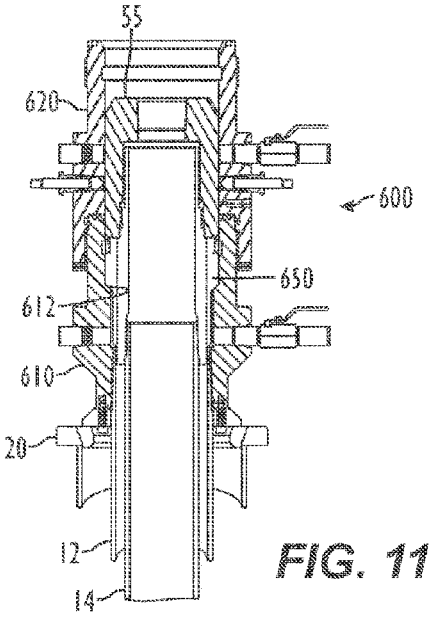
Figure 11C:
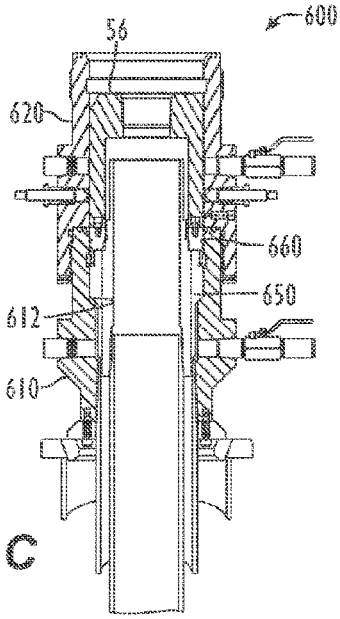
Figure 11D:
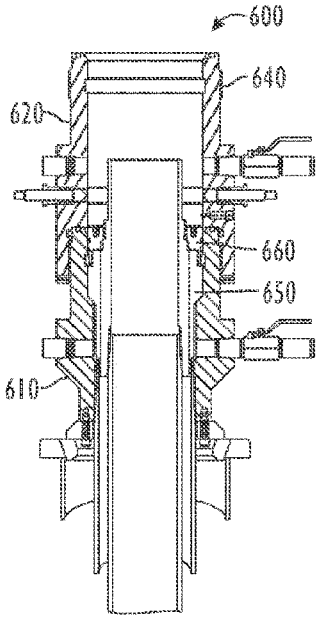

As shown in FIG. 11B, another running tool 54 runs a hanger 650 and attached inner casing 14 through the head components 610/620 and lands the hanger 650 on the shoulder 612 inside the first component 610. Subsequently, as shown in FIG. 11C, another running tool 56 lands a pack-off plate 660 above the hanger 650. The modular assembly 600's resulting double-bowl type of arrangement is shown in FIG. 11D. At this point in the assembly *as shown in FIG. 11E*, additional pack-off components *522*, another inner casing *15*, and an additional hanger *540* can be landed in the second head component 620 *and a head ring 550 can be used,* as with the assembly in FIGS. 10A-10B. In this way, the modular assembly 600 can support multiple casing strings (*e.g., 14, 15*). For example, an 11-inch embodiment of the assembly 600 could support two casing strings, while a 13-inch embodiment of the assembly 600 could support three casing strings.

Figure 12A:
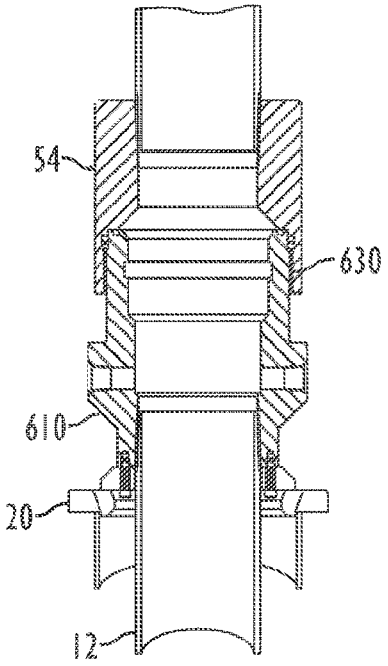
FIGS. 12A-12B are cross-sectional views illustrating the modular assembly using only a first head component.
Figure 12B:
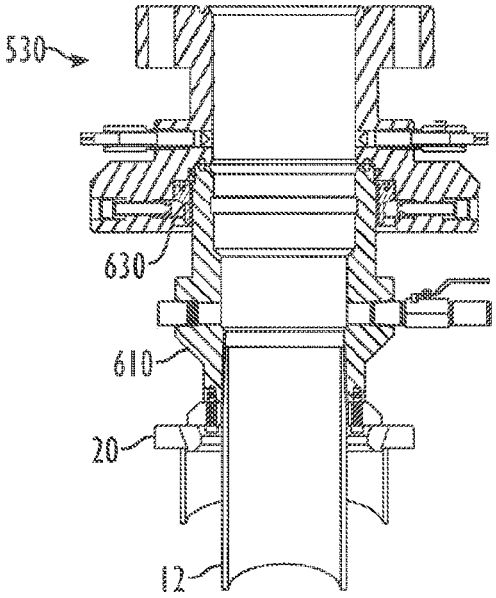
Figure 13:
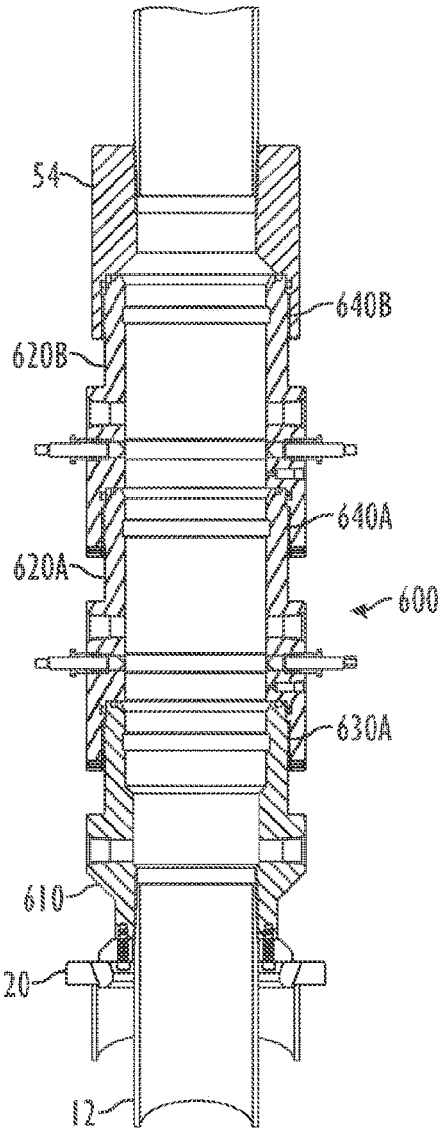
FIG. 13 is a cross-sectional view illustrating the modular assembly using three head components.

As shown in FIGS. 11A-11D, the first and second head components 610/620 of the modular assembly 600 can be used to create a double-bowl type of casing head. Because the disclosed assembly 600 is modular, the first head component 610 can be used by itself. As shown in FIGS. 12A-12B, for example, the first head component 610 can be landed on the landing assembly 20 with a running tool 54, and a quick connect drilling adapter 530 or some other desired component can be attached to the first component 610 to complete the assembly. Alternatively, the first head component 610 can be used in other arrangements disclosed herein, such as in FIGS. 2, 3A, 4, and 9A-9B. In another alternative shown in FIG. 13, two of the second head components 620a-b can be stacked on top of one another above the first head component 610 to create a three component modular assembly, which can be used to support multiple casing strings.

Figure 14A:
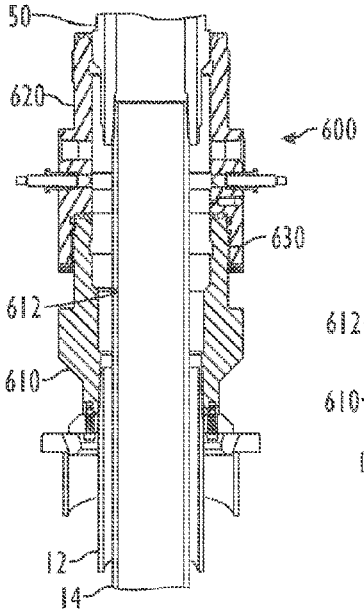
FIGS. 14A-14C are cross-sectional views illustrating the modular assembly when stuck pipe occurs.

Not only does the modular assembly 600 provide for versatile arrangements, but it facilitates contingency operations when a stuck pipe occurs. When running the casing 14 and hanger 650 through the head components 610/620 and the outer casing 12, for example, the inner casing 14 may become stuck in what is commonly referred to as a stuck pipe situation—an example of which is shown in FIG. 14A. Because the inner casing 14 cannot be inserted enough to allow the attached hanger 650 to be landed on the shoulder 612, operators must perform a contingency operation that involves using slips to secure the inner casing 14 in tension within the casing head and cutting the excess portion from the inner casing 14 that has been prevented from passing through the casing head.

In a conventional double-bowl casing head, cutting the excess casing can be difficult because the point at which the cut must be made lies deep within the double-bowl casing head. In other words, an operator has to carefully cut the casing within the confined space of the double-bowl head with a welding tool and then to prepare the end of the cut casing properly for further operations.

Figure 14B:
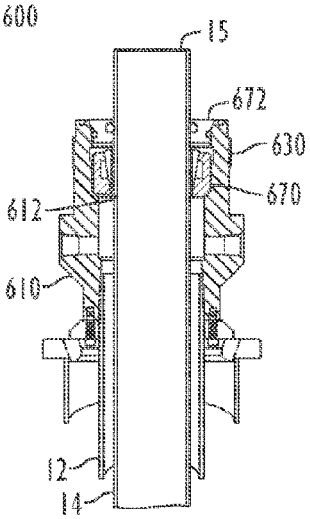
Figure 14C:
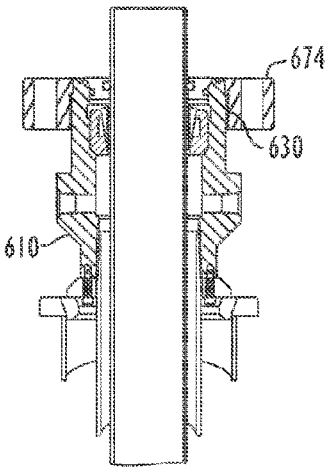

The modular assembly 600, however, facilitates stuck pipe contingency operations. When a stuck pipe occurs as in FIG. 14A, operators position a slip assembly 670 and pack-off 672 in the first component 610 as shown in FIG. 14B and then remove the second component 620 from the first component 610 at the threaded connection 630. Removing the second component 620 leaves the excess casing 14 exposed above the first component 610. Operators can then more readily cut the excess casing 14 at the appropriate point, level the cut end 15, and create the needed chamfer at the edge. After these steps have been completed, operators can reconnect the second component 620 to the first component 610. Alternatively, operators can attach a rotating flange 674 to the connection end 631 of the first component 610 as shown in FIG. 14C or couple components of some other desired arrangement to the first component 610.

In addition to facilitating preparation of the inner casing 14 during stuck pipe contingency operations, the modular assembly 600 also helps operators perform modifications to a control line when a stuck pipe occurs. For example, FIG.

15A shows the modular assembly 600 having a control line 700 that runs down the annulus to a valve or the like (not shown). The control line 700 connects by a ferrule coupling 702 to a hanger 650, and a side coupling 704 in the first head component 610 communicates with a port in the hanger 650 to communicate with the control line 700.

If a stuck pipe occurs while running the inner casing 14, the hanger 650, and the control line 700 downhole, operators have to modify the arrangement of the control line 700 to connect it to the side coupling 704. In a conventional double-bowl type of head, operators would have to modify the control line's connection by making modifications deep within the double-bowl head and confined in the annulus between the inner casing and the head.

Figure 15A:
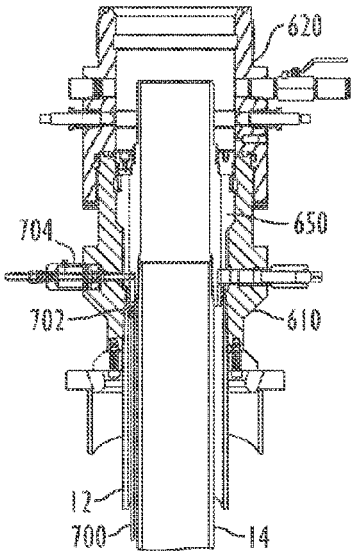
FIGS. 15A-15C are cross-sectional views illustrating the modular assembly having a control line when stuck pipe occurs.
Figure 15B:
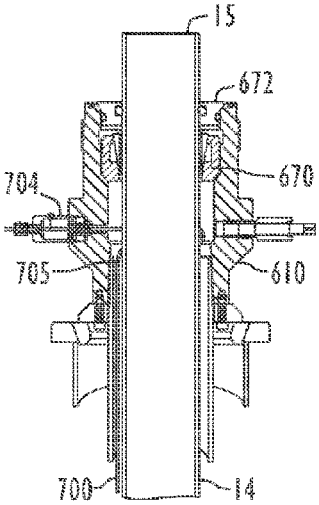
Figure 15C:
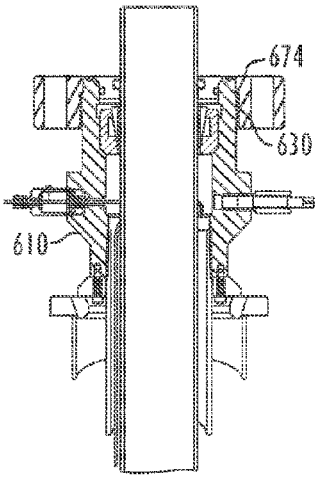

The disclosed modular assembly 600, however, alleviates some of this difficulty. For example, as shown in FIG. 15B, the second component 620 can be removed from the first head component 610 giving operators easier access to the control line 700 and the inside of the coupling 704. Before putting the slip assembly 670 and pack-off 672 in the head, for example, operators can wind excess amounts of control line 700 in wraps 705 around the casing 14 and attach the line 700 to the coupling 704 inside the first component 610 while having easier access inside the annulus. After setting up the control line 700, putting the slip assembly 670 and pack-off 672 in the first head component 610, and cutting the excess of the casing 14, operators can reconnect the second component 620 to the first component 610. Alternatively, operators can attach a rotating flange 674 to the end *630* of the first component 610 as shown in FIG. 15C, or couple components of some other desired arrangement to the first component 610.

The foregoing description of preferred and other embodiments is not intended to limit or restrict the scope or applicability of the inventive concepts conceived of by the Applicants. For example, it will be appreciated with the benefit of the present disclosure that components of one embodiment of the wellhead completion assembly can be combined with components of another embodiment to produce a variety of versatile arrangements for well completions. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. wellhead completion assembly, comprising:

a casing head connecting to casing at a wellhead and having a first external threaded connection adjacent a first end;

a casing hanger landing in the casing head and having a shoulder and a second end, the second end extending beyond the first end of the casing head and having a second external threaded connection, the second external threaded connection connectable to a connector to support at least one additional component above the casing hanger;

a pack-off plate disposed on the second end of the casing hanger adjacent the shoulder, the pack-off plate having an upper surface, an inner portion, and an outer portion, the inner portion [sealable] *sealably* engaging an external surface of the casing hanger, the outer portion [sealable] *sealably* engaging an internal surface of the casing head; and a head ring threadably connecting to the first external threaded connection of the casing head and defining an opening through which the second end of the casing hanger extends, a portion of the head ring directly engaging the upper surface of the pack-off plate.

2. The assembly of claim 1, wherein the pack-off plate comprises:

a first pair of sealing seats on the outer portion, a second pair of sealing seats on the inner portion, and a test port defined in the upper surface and accessible through the opening in the head ring, the test port communicating with the inner and outer portions between the first and second pairs of sealing seats.

3. The assembly of claim 1, wherein the casing head comprises a single-bowl arrangement defining an internal shoulder within an internal bore, the casing hanger landing on the internal shoulder to be supported therein.

4. The assembly of claim 1, wherein the casing head comprises a double-bowl arrangement defining an internal shoulder within an internal bore, the casing hanger landing on one or more components supported by the internal shoulder.

5. The assembly of claim 1, wherein the casing hanger defines at least one flute, and wherein the pack-off [plates] *plate* seals fluid communication through the at least one flute.

6. The assembly of claim 1, further comprising a hanger ring positionable about the external surface of the casing hanger, and wherein the pack-off plate comprise a lip positionable in wedged engagement between the hanger ring and a portion of the external surface of the casing hanger.

7. The assembly of claim 4, wherein the casing head for the double-bowl arrangement comprises at least two head components interconnectable to one another, a first of the head components having the internal shoulder therein, a second of the head components having the first external threaded connection to which the head ring threadably connects.

8. The assembly of claim 6, wherein the inner portion of the pack-off plate threadably connects to a third threaded connection on the external surface of the casing hanger.

9. A wellhead completion assembly, comprising:

a casing head connecting to a first casing and having a first external threaded connection adjacent a first end, the casing head comprising a double-bowl arrangement defining an internal shoulder within an internal bore;

a casing hanger landing on one or more other components supported by the internal shoulder of the casing head, the casing hanger defining at least one flute and having a shoulder and a second end, the second end extending beyond the first end of the casing head and having a second external threaded connection, the second external threaded connection connectable to a connector to support at least one additional component above the casing hanger;

a head ring threadably connecting to the first external threaded connection of the casing head and defining an opening through which the second end of the casing hanger extends; and at least one pack-off component [positioning] *positioned* between the shoulder of the casing hanger and a portion of the head ring, the at least one pack-off component sealably engaging an external surface of the casing hanger and sealably engaging an internal surface of the casing head, the at least one pack-off component sealing fluid communication through the at least one flute in the casing hanger.

10. The assembly of claim 9, wherein the casing head for the double-bowl arrangement comprises at least two head components interconnectable to one another, a first of the head components having the internal shoulder therein, a second of the head components having the first external threaded connection to which the head ring threadably connects.

11. The assembly of claim 9, wherein the at least one pack-off component comprises a pack-off plate having— an inner portion threadably connecting to a third threaded connection on the external surface of the casing hanger, and an outer portion sealably engaging the internal surface of the casing head.

12. The assembly of claim 11, wherein the at least one pack-off component comprises a hanger ring positionable about the external surface of the casing hanger, and wherein the pack-off plate comprise a lip positionable in wedged engagement between the hanger ring and a portion of the external surface of the casing hanger.

13. The assembly of claim 9, wherein the at least one pack-off component comprises a pack-off plate having— a first pair of sealing seats on an outer portion, a second pair of [seals] *sealing seats* on an inner portion, and a test port defined in an upper surface of the plate and accessible through the opening in the head ring, the test port communicating with the outer portion between the first pair of sealing seats and communicating with the inner portion between the second pair of sealing seats.

14. A *system for a* wellhead completion assembly, comprising:

a first head component having one end connectable to casing at a wellhead and having a first external threaded connection adjacent another end; and second head components each having [second] *an* internal threaded [connections] *connection* adjacent one end and having *a* second external threaded [connections] *connection* adjacent another end, [the second] *each* internal threaded connection connectable to the first external threaded connection on the first head component, the [second] internal and external threaded connections of *each of* the second head components being complementary and threadably interconnectable to one another, wherein the first head component is Used independently on the wellhead for a single-bowl arrangement of the wellhead completion assembly, wherein one of the second head components is used in conjunction with the first head component for a first multiple-bowl arrangement of the wellhead completion assembly, the [second] internal threaded connection of the one second head component connecting to the first external threaded connection on the first head component to stack the one second head component on top of the first head component; and wherein two or more of the second head components are used in conjunction with the first head component for second multiple-bowl arrangements of the wellhead completion assembly, the [second] internal and external threaded connections of the second head components interconnecting to one another to stack the two or more second head components on top of one another, the internal threaded connection of a lowermost one of the second head components connecting to the first external threaded connection on the first head component to stack the second head components on top of the first head component.

15. The *system for the* assembly of claim 14, further comprising:

a casing hanger [supported] *supportable* in the wellhead completion assembly, the casing hanger having a distal end extending beyond *the first head component in the single-bowl arrangement or beyond* a topmost [end] *one of the second head components in the multiple-bowl arrangements* of the wellhead completion assembly, the distal end having an external threaded connection connectable to a connector to support at least one additional component above the casing hanger; and a head ring threadably connectable to the first external threaded connection on the first head component in the single-bowl arrangement or threadably connectable to the second external connection of a topmost one of the second head components in the [multi-bowl arrangement] *multiple-bowl arrangements*, the head ring defining an opening through which the distal end of the casing hanger extends.

16. The *system for the* assembly of claim 15, wherein a portion of the head ring directly engages a shoulder of the casing hanger, and wherein the casing hanger comprises— a pair of sealing seats on an outer surface, and a test port defined in the shoulder and accessible through the opening in the head ring, the test port communicating between the pair of sealing seats.

17. The *system for the* assembly of claim 15, further comprising a pack-off plate disposed in the topmost [end] *one* of the [wellhead completion assembly] *head components* between the casing hanger and a portion of the head ring, wherein the pack-off plate comprises:

an upper surface positioning adjacent the portion of the head ring;

an inner portion engaging an external surface of the casing hanger, and an outer portion engaging an internal surface of the wellhead completion assembly.

18. The *system for the* assembly of claim 17, wherein the pack-off plate comprises:

a first pair of sealing seats on the outer portion, a second pair of sealing seats on the inner portion, and a test port defined in the upper surface and accessible through the opening in the head ring, the test port communicating with the inner and outer portions between the first and second pairs of sealing seats.

19. The *system for the* assembly of claim 14, further comprising:

a hub threading on the first external threaded connection of the first head component in the single-bowl arrangement or threading on the second external threaded connection of the topmost one of the second head components in the [multi-bowl] *multiple-bowl* arrangements; and an adapter [disposing] *disposed* on [the] *an* end of *one* the first or second head [component] *components* and locking to the hub, the adapter [connecting] *connectable* to at least one additional component above the wellhead assembly.

20. The *system for the* assembly of claim 14, wherein in the first and second multiple-bowl arrangements, the [one or more] second head components are removable from the first head component to expose an end of a stuck pipe in the wellhead completion assembly; and wherein a rotatable flange connects to the first external threaded connections of the first head component to support one or more additional components above the first head component.

21. A hanger pack-off assembly, comprising:

a casing hanger positionable in a casing head and having a first external threaded connection about an external surface;

a hanger ring positionable about the external surface of the casing hanger; and a pack-off plate defining [an] *a first* opening through first and second sides of the plate, the *first* opening having a first internal threaded connection threading onto the first external threaded connection on the casing hanger, an outer surface of the plate having a first pair of sealing seats formed thereabout, an inner surface of the plate having a second pair of sealing seats formed thereabout, a test port defined in the first side of the plate and communicating with the inner and outer surfaces between the first and second pairs of sealing seats, the pack-off plate comprising a lip positionable in wedged engagement between the hanger ring and a portion of the external surface of the casing hanger.

22. The assembly of claim 21, further comprising a head ring threadably [connecting] *connectable* to the casing head and defining [an] *a second* opening therethrough, wherein the casing hanger has a distal end extending through the *second* opening, the distal end having a second external threaded connection to which a component connects to the casing hanger.

23. A wellhead completion method, comprising:

connecting a casing head to surface casing;

landing a casing hanger in the casing head to support production casing in the surface casing such that an upper end of the casing hanger extends beyond an upper end of the casing head;

disposing a pack-off plate on the upper end of the casing hanger, the pack-off plate sealably engaging an external surface of the casing hanger and sealably engaging an internal surface of the casing head;

threadably connecting a head ring on the upper end of the casing head and directly engaging an upper surface of the pack-off plate with the head ring, the upper end of the casing head fitting through an opening of the head ring;

threading a connector to the upper end of the casing hanger; and connecting an additional component above the casing hanger by connecting to the connector.

24. The method of claim 23, wherein disposing the pack-off plate on the upper end of the casing hanger comprises threading an inside portion of the pack-off plate on external [thread] *threads* on the upper end of the casing hanger.

25. The method of claim 23, wherein disposing the pack-off plate on the upper end of the casing hanger comprises sealing an inner pair of seals on the pack-off plate against the external surface of the casing hanger and sealing an outer pair of seals on the pack-off plate against the internal surface of the casing head.

26. The method of claim 25, further comprising testing the inner and outer pairs of seals via a test port defined in the upper surface of the pack-off plate and accessible through the opening in the head ring.

27. The method of claim 23, wherein disposing the pack-off plate on the upper end of the casing hanger comprises:

wedging a lip on the pack-off plate between a hanger ring and the external surface of the casing hanger, and engaging the hanger ring against the internal surface of the casing head.

28. The method of claim 23, wherein threading the connector to the upper end of the casing hanger comprises threading a rotatable flange to the upper end of the casing hanger.

29. The method of claim 28, wherein connecting the additional component above the casing hanger comprises connecting a gate valve for a facing operation to the rotatable flange.

30. The method of claim 23, wherein before threadably connecting the head ring, threading the connector to the upper end of the casing hanger, and connecting the additional component above the casing hanger, the method comprises initially removing a blow out preventer stack and a first rotatable flange from the casing head, the first rotatable flange being threaded on an external thread on the casing head.

31. The method of claim 30, wherein the first rotatable flange is rated for a first working pressure, and wherein the connector threading to the upper end of the casing hanger comprises a second rotatable flange having a second working pressure greater than the first working pressure.

32. The method of claim 23, wherein landing the casing hanger comprises passing the casing hanger on a running tool through a blow out preventer stack installed on the casing head.

33. A wellhead completion assembly, comprising:

a casing head connecting to casing at a wellhead and having a first external threaded connection adjacent a first end;

a casing hanger landing in the casing head and having a second end and a shoulder, the casing hanger comprising a pair of sealing seats on an outer surface and comprising a test port defined in the shoulder, the test port communicating between the pair of sealing seats, the second end extending beyond the first end of the casing head and having a second external threaded connection, the second external threaded connection connectable to a connector to support at least one additional component above the casing hanger; and a head ring threadably connecting to the first external threaded connection of the casing head and defining an opening through which the second end of the casing hanger extends, a portion of the head ring directly engaging the shoulder on the casing hanger, the test port in the shoulder of the casing hanger being accessible through the opening in the head ring.

34. The assembly of claim 33, wherein the casing head comprises a single-bowl arrangement defining an internal shoulder within an internal bore, the casing hanger landing on the internal shoulder to be supported therein.

35. The assembly of claim 33, wherein the casing head comprises a double-bowl arrangement defining an internal shoulder within an internal bore, the casing hanger landing on one or more components supported by the internal shoulder.

36. The assembly of claim 35, wherein the casing head for the double-bowl arrangement comprises [and] *at* least two head components interconnectable to one another, a first of the head components having the internal shoulder therein, a second of the head components having the first external threaded connection to which the head ring threadably connects.

37. A wellhead completion assembly, comprising:

a casing head connecting to a first casing and having a first external threaded connection adjacent a first end, the casing head comprising a double-bowl arrangement defining an internal shoulder within an internal bore;

a casing hanger landing on one or more other components supported by the internal shoulder of the casing head, the casing hanger having a shoulder and a second end, the second end extending beyond the first end of the casing head and having a second external threaded connection, the second external threaded connection connectable to a connector to support at least one additional component above the casing hanger;

a head ring threadably connecting to the first external threaded connection of the casing head and defining an opening through which the second end of the casing hanger extends;

a hanger ring positionable about an external surface of the casing hanger; and a pack-off plate [positioning] *positioned* between the shoulder of the casing hanger and a portion of the head ring, the pack-off plate having an inner portion threadably connecting to a third threaded connection on the external surface of the casing hanger, the pack-off plate having an outer portion sealably engaging an internal surface of the casing head, the pack-off plate comprising a lip positionable in wedged engagement between the hanger ring and a portion of the external surface of the casing hanger.

38. The assembly of claim 37, wherein the casing head for the double-bowl arrangement comprises [and] *at* least two head components interconnectable to one another, a first of the head components having the internal shoulder therein, a second of the head components having the first external threaded connection to which the head ring threadably connects.

39. The assembly of claim 37, wherein the casing hanger defines at least one flute, and wherein the [at least one] pack-off plate seals fluid communication through the at least one flute.

40. The assembly of claim 37, wherein the pack-off plate comprises— a first pair of sealing seats on the outer portion, a second pair of [seals] *sealing seats* on the inner portion, and a test port defined in an upper surface of the plate and accessible through the opening in the head ring, the test port communicating with the outer portion between the first pair of sealing seats and communicating with the inner portion between the second pair of sealing seats.

* * * * *